(12) United States Patent
Wilson

(10) Patent No.: US 8,671,550 B1
(45) Date of Patent: Mar. 18, 2014

(54) WIRE ELECTRICAL DISCHARGE MACHINED RUPTURE DISK AND METHOD

(75) Inventor: Alan Wilson, Broken Arrow, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 1494 days.

(21) Appl. No.: 11/956,047

(22) Filed: Dec. 13, 2007

Related U.S. Application Data

(60) Provisional application No. 60/870,000, filed on Dec. 14, 2006.

(51) Int. Cl.
*B23P 13/04* (2006.01)

(52) U.S. Cl.
USPC .......................................................... 29/557

(58) Field of Classification Search
USPC .......................................... 29/557; 220/89.1
See application file for complete search history.

(56) References Cited

U.S. PATENT DOCUMENTS

| | | | | |
|---|---|---|---|---|
| 4,655,070 A | * | 4/1987 | Clift | 72/325 |
| 4,698,478 A | * | 10/1987 | Girardin | 219/69.12 |
| 5,411,158 A | * | 5/1995 | Kays et al. | 220/89.2 |
| 7,600,527 B2 | * | 10/2009 | Shaw et al. | 137/68.27 |
| 2003/0118144 A1 | * | 6/2003 | Erbes et al. | 376/260 |
| 2007/0039178 A1 | * | 2/2007 | Bladon | 29/889.23 |

* cited by examiner

*Primary Examiner* — David Bryant
*Assistant Examiner* — Moshe Wilensky
(74) *Attorney, Agent, or Firm* — Garvey, Smith, Nehrbass & North, L.L.C.; Charles C. Garvey, Jr.; Vanessa M. D'Souza

(57) ABSTRACT

The present invention provides an improved method of manufacturing a rupture disk and specifically of forming a score on a rupture disk. The method of the present invention includes the rotating of a rupture disk blank relative to an electrical discharge machining or "EDM" cutting wire and the simultaneous moving of the EDM cutting wire toward the axis of the disk while maintaining the wire in a selected position such as generally parallel to the disk peripheral skirt or flange. The rotation of the disk and the movement of the EDM wire can be precisely controlled with the motion system of a commercially available EDM machine. With the present invention, a precise score is cut a partial distance through the disk thickness and preferably on the convex side of the dome, near the transition from the dome to the flange and in a generally "c" shaped pattern. The formed score creates a pattern of weakness so that the disk will open in either of the forward or reverse buckling direction. Score patterns other than the "c" shaped pattern could be cut.

36 Claims, 2 Drawing Sheets

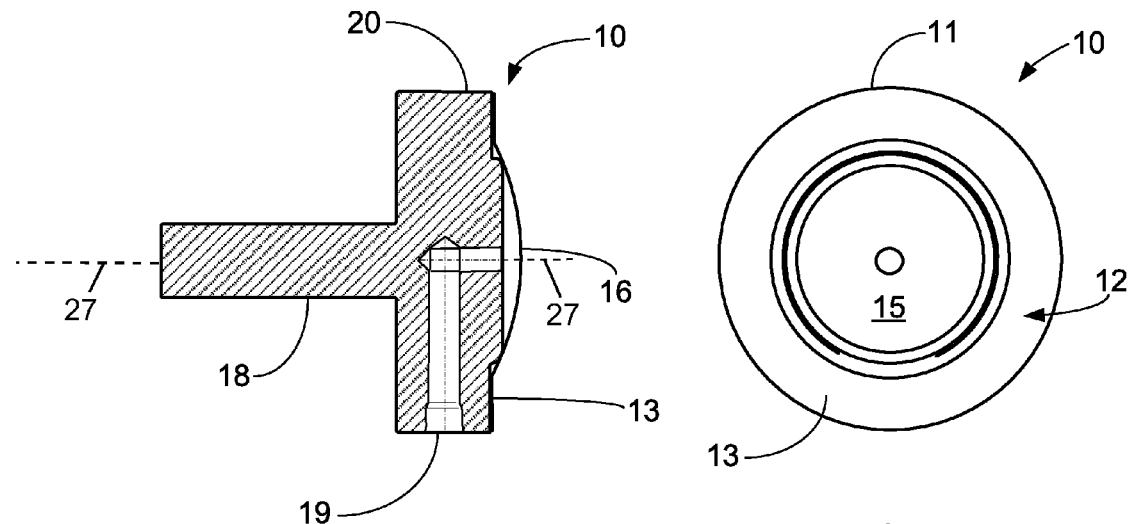
FIG. 1
FIG. 2
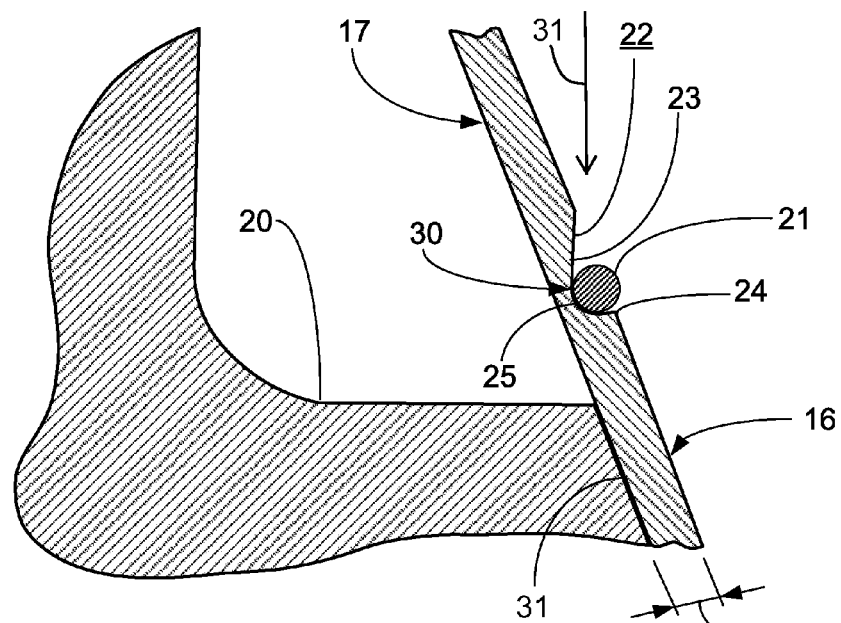
FIG. 6

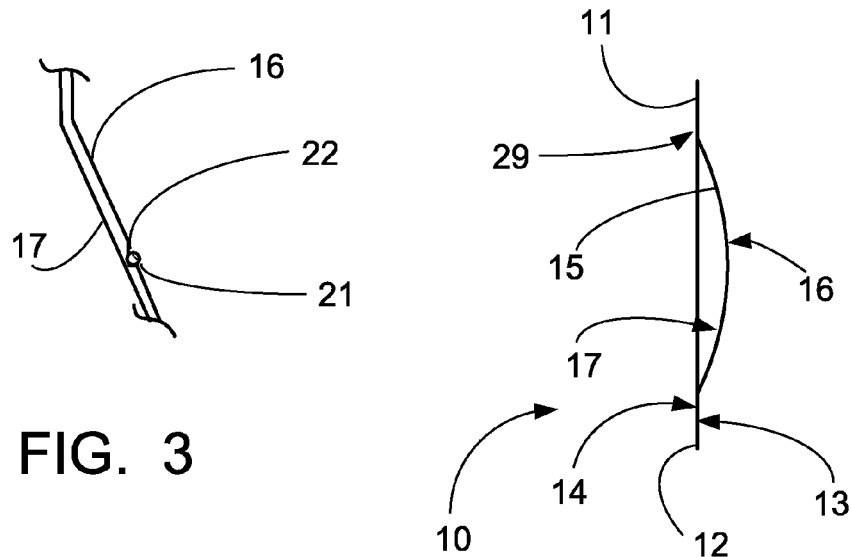
FIG. 3
FIG. 4
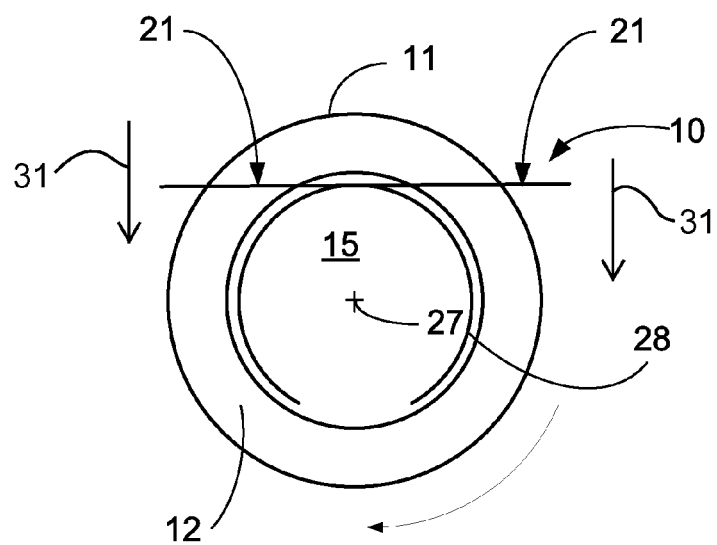
FIG. 5

WIRE ELECTRICAL DISCHARGE MACHINED RUPTURE DISK AND METHOD

CROSS-REFERENCE TO RELATED APPLICATIONS

Priority of U.S. Provisional Patent Application Ser. No. 60/870,000, filed Dec. 14, 2006, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the manufacturing of rupture disks. More particularly, the present invention relates to an improved method of manufacturing a rupture disk that has a concave convex central disk portion surrounded by a planar peripheral skirt, wherein the disk is rotated about a central disk axis, and wherein a wire electric discharge machine forms a score or cut that extends a partial distance through the outer surface of the disk concave convex portion. The score predictably contributes to disk failure when the rupture disk is subjected to a design pressure value.

2. General Background of the Invention

Rupture disks are used in a variety of chemical process and manufacturing applications. The Oklahoma Safety Equipment Corporation website (www.oseco.com) provides many rupture disk products that are available to satisfy numerous applications.

In the past, rupture disks have been scored in hydraulic presses using very precisely machined and hardened tooling and hardened sine bars to control the score depth. Changes in the profile of the disk or the geometry of the score necessitate the design and manufacture of new score blades and anvils.

Scoring with hard tooling work hardens the disk material often requiring a post score anneal or stress relief. Worn or damaged tooling must be rebuilt and replaced. Hard materials are especially prone to damaging score tooling. The need to heat treat and harden tooling makes it difficult to manufacture in large sizes as the heat treatment often distorts the tooling beyond acceptable tolerances.

BRIEF SUMMARY OF THE INVENTION

The method of the present invention offers several advantages over previous methods of manufacturing rupture disks including previous methods of scoring rupture disks.

The new method of the present invention includes rotating a rupture disk blank and electrical discharge machining cutting wire relative to one another while moving the cutting wire toward the axis of the disk and while maintaining the wire in a selected position (e.g. parallel to the disk flange). The relative rotation of the disk and wire and the movement of the wire toward the disk can be precisely controlled by a motion system of an electrical discharge machining apparatus or "EDM" machine. The objective is to cut a precise "score" part way through the disk thickness. The "score" can be on the convex side of the dome. The score can be near the transition from the dome to the flange. The score extends less than 360 degrees circumferentially in a generally "c" shaped pattern. This score will create a pattern of weakness so the disk will open in either the forward or the reverse buckling direction. Patterns other than a "c" shaped pattern could be cut as well.

The score tool is electrical discharge machining or "EDM" wire, which is constantly renewed. Changes in score depth or shape can be achieved by machine programming. Standard EDM equipment with a controlled rotary table could be used to cut or score multiple disk sizes. Tooling to hold the disk in the rotary table would be developed for each disk size, however the same tooling could be used for all thicknesses and disk materials.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a sectional view illustrating the preferred method of the present invention;

FIG. 2 is an end view of the method and apparatus of the present invention;

FIG. 3 is an enlarged partial sectional view of the method of the present invention showing disk, score and EDM wire;

FIG. 4 is a sectional view of the preferred embodiment of the apparatus of the present invention;

FIG. 5 is a plan view of the preferred embodiment of the apparatus of the present invention; and FIG. 6 is an enlarged fragmentary view of the preferred embodiment of the apparatus of the present invention and showing the method of the present invention.

DETAILED DESCRIPTION OF THE INVENTION

FIGS. 1-6 show the preferred embodiment of the apparatus of the present invention, designated generally by the numeral 10 in FIGS. 1-2 and 4-5. The method of the present invention includes the step of rotating a disk blank 11 (that is mounted upon a tool or tool base 18) and a cutting wire 21 relative to one another. Simultaneously, the cutting wire (preferably an electrical discharge machining wire or "EDM" wire) 21 is moved toward the central axis 27 of the disk blank 11. The method of the present invention places the wire 21 in a selected position, such as for example generally parallel to the disk blank peripheral skirt or flange 12 as shown in FIGS. 3 and 5. A relative rotation of the disk blank 11 and wire 21, coupled with movement of the EDM wire 21 toward the disk central axis 27 (see FIGS. 1, 5 and arrows 31 in FIGS. 5, 6) can be precisely controlled by the motion control system of a commercially available EDM apparatus. Such EDM apparatus are commercially available from Mitsubishi and Fanuc, as examples. With the method of the present invention, a precise score 22 can be cut a partial distance through the disk blank 11 and preferably, through the concave convex dome portion 15 of the disk blank 11. This cut or score 22 is preferably performed on the convex surface 16 of the concave convex central disk or dome portion 15. The precisely cut score 22 can be positioned near the transition from the concave convex dome portion 15 to the flange or skirt 12 and can be in a generally "c" shaped score pattern 28 (see FIG. 5).

In FIGS. 1-6, rupture disk apparatus 10 is formed from a disk blank 11 that has a peripheral skirt or flange and a concave convex central dome portion 15. The peripheral skirt or flange 12 has an upper surface 13 and a lower surface 14. Peripheral skirt or flange 12 preferably forms a plane 29. Concave convex dome portion 15 provides a convex surface 16 and a concave surface 17. In the preferred embodiment, the concave convex dome portion 15 is scored. A precise score transverse or radial cross section 25 in FIG. 6 is cut partway through the disk blank thickness as indicated by the arrow 26. The transverse or radial cross section 25 includes a larger generally flat score surface 23 and a smaller generally flat or curved score surface 24. These surfaces 23, 24 can form an angle of about 90 degrees. Surfaces 23, 24 are joined with a curved surface 30 that has about the same curvature as the curvature of the outer surface of the EDM wire 21 (see FIG. 6).

The disk blank 11 is mounted upon a disk fixture, tool or tool holder base 18. In FIG. 1, tool base 18 provides a disk fixture part 20. As part of a preferred embodiment of the method of the present invention, tool 18 supports disk blank 11. Disk fixture part 20 of tool 18 engages peripheral flange 12, concave convex disk portion 15 or both peripheral flange 12 and concave convex disk portion 15. A vacuum applied to channel 19 can be used to hold or engage disk blank 11 to fixture 20.

As part of the method of the present invention, an electrical discharge machining wire 21 is moved toward the axis 27 of the disk blank 11 while maintaining the wire 21 in a selected position such as parallel to the plane 29 of flange or skirt 12 of the disk blank 11.

The tool base 18 and disk fixture 20 are rotated, the disk blank 11 rotating with the disk fixture 20. The rotation of the disk blank 11 and wire 21 relative to one another and the movement of the wire 21 toward the disk blank 11 can be controlled by the motion system of a commercially available EDM machine. Such machines are commercially available from Mitsubishi or Fanuc. Such EDM machines have been patented. Examples can be seen in U.S. Pat. Nos. 7,013,195; 7,038,158; 6,875,943; 6,855,904; 6,621,033, each of these patents being hereby incorporated herein by reference.

In FIG. 5, a score pattern 28 that is generally "c" shaped is shown. It should be understood, however, that patterns other than a "c" shaped pattern could be cut as well. Score 22 creates a pattern of weakness so that the disk 10 will open in either the forward or the reverse buckling direction at a selected design pressure value.

The wire 21 is constantly renewed during machining of the score 22. Changes in score 22 depth or in score shape or pattern 28 can be modified using programming associated with the commercially available EDM machine. Commercially available EDM equipment can be used with a controlled rotary table to cut multiple disk sizes. Tooling to hold the disk blank 11 of a particular size on a rotary table could be provided for different disk sizes. The same tooling could be used for example for all thicknesses and disk materials.

Disk fixture 20 supports rupture disk 10. Disk fixture 20 can support flange 12. Disk fixture 20 can support concave convex central disk portion 15. Disk fixture 20 can support rupture disk 10 at both flange 12 and concave convex portion 15.

The following is a list of parts and materials suitable for use in the present invention.

PARTS LIST

| Part Number | Description |
|---|---|
| 10 | rupture disk apparatus |
| 11 | disk blank |
| 12 | peripheral skirt or flange |
| 13 | upper surface |
| 14 | lower surface |
| 15 | concave convex central disk or dome portion |
| 16 | convex surface |
| 17 | concave surface |
| 18 | disk fixture, tool, tool base or tool holder base |
| 19 | vacuum line channel |
| 20 | disk fixture part |
| 21 | cutting wire or EDM wire |
| 22 | score |
| 23 | larger score surface |
| 24 | smaller score surface |
| 25 | score transverse/radial cross section |
| 26 | arrow |
| 27 | axis |
| 28 | score pattern |
| 29 | plane |
| 30 | curved surface |
| 31 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of constructing a rupture disk, comprising the steps of:
    a) providing a disk blank having a peripheral flange and a concave convex portion that is surrounded by the peripheral flange;
    b) rotating the disk blank upon a turntable wherein the turntable engages the concave convex portion of the disk blank;
    c) during the rotating of step "b", scoring the surface of the concave convex portion with a wire of a wire electrical discharging machine, said wire having an outer surface with a shape;
    d) wherein the score includes a shaped part, at least a portion of the shaped part having the shape of the outer surface of the wire;
    e) wherein the wire is advanced toward the disk central axis as the score is formed in steps "b" and "c";
    f) wherein the wire is spaced away from the peripheral flange in step "d"; and
    g) wherein in steps "c" and "d" the wire is positioned generally parallel to a plane defined by the peripheral flange.

2. The method of claim 1 wherein the wire is between about 0.004 and 0.0012 inches in diameter.

3. The method of claim 1 wherein the wire is about 0.0010 inches in diameter.

4. The method of claim 1 wherein the score formed in step "c" has a transverse cross section and the wire has a transverse cross section that is different in shape than the transverse cross section of the score.

5. The method of claim 1 wherein the score formed in step "c" has multiple surfaces that are of different curvatures in transverse cross section.

6. The method of claim 5 wherein the multiple surfaces include at least one generally flat surface.

7. The method of claim 1 wherein the disk blank has a thickness of between 0.003 and 0.125 inches.

8. The method of claim 1 wherein the disk blank has a thickness of between about 0.003 and 0.375 inches.

9. The method of claim 1 wherein a distance between the wire and the peripheral flange is between about 0.020 and 2.0 inches.

10. The method of claim 1 wherein a convex surface of the disk blank is scored in step "c".

11. The method of claim 1 wherein the disk blank has a central axis and wherein the score in step "c" extends less than 360 degrees around the disk blank central axis.

12. The method of claim 1 wherein in steps "b" and "c" rotation of the turntable is controlled by the wire electrical discharge machine.

13. The method of claim 1 wherein in step "c" movement of the wire is controlled by the wire electrical discharge machine.

14. The method of claim 1, further comprising the step of forming an asymmetrical transverse cross section score on the disk blank.

15. A method of constructing a rupture disk, comprising the steps of:
   a) providing a disk blank having a central axis, a peripheral flange and a concave convex portion that is surrounded by the peripheral flange;
   b) rotating the disk blank and a cutting wire relative to each other;
   c) during said rotating, scoring the surface of the concave convex portion with the wire, wherein the wire is an electrical discharging machine wire that contacts the disk concave convex portion while scoring said surface;
   d) wherein the wire is advanced toward the disk central axis as the score is formed in steps "b" and "c";
   e) wherein the wire is spaced away from the peripheral flange in step "d"; and
   f) wherein in steps "c" and "d" the wire is positioned generally parallel to a plane defined by the peripheral flange.

16. The method of claim 15 wherein the wire is between about 0.004 and 0.0012 inches in diameter.

17. The method of claim 15 wherein the wire is about 0.0010 inches in diameter.

18. The method of claim 15 wherein the score formed in steps "c" and "d" has a cross section that is asymmetrical in transverse cross section.

19. The method of claim 15 wherein the score formed in steps "c" and "d" has surfaces that are of different curvatures in transverse cross section.

20. The method of claim 15 wherein the score formed in steps "c" and "d" has a generally flat surface.

21. The method of claim 15 wherein the wire is positioned in step "c" to cut only partially through the disk blank.

22. The method of claim 15 wherein the disk blank has a thickness of between 0.003 and 0.125 inches.

23. The method of claim 15 wherein the disk blank has a thickness of between about 0.003 and 0.375 inches.

24. The method of claim 15 wherein a distance between the wire and the peripheral flange is between about 0.020 and 2.0 inches.

25. The method of claim 15 wherein a convex surface of the disk blank is scored in steps "c" and "d".

26. The method of claim 15 wherein the score in steps "c" and "d" extends less than 360 degrees around the disk blank central axis.

27. The method of claim 15 wherein in steps "b" and "c" the disk blank is supported upon a tool and wherein rotation of the tool is controlled by the wire electrical discharge machine.

28. The method of claim 15 wherein in step "c" movement of the wire is controlled by the wire electrical discharge machine.

29. The method of claim 15 wherein the disk blank is supported by a tool and wherein the tool engages the disk concave convex portion.

30. The method of claim 15 wherein the disk blank is supported by a tool and wherein the tool engages the disk peripheral flange.

31. The method of claim 15, further comprising the step of forming an asymmetrical transverse cross section score on the disk blank.

32. The method of claim 15, further comprising the step of supporting the disk blank on a tool.

33. The method of claim 32, further comprising the step of engaging the tool to the disk peripheral flange.

34. The method of claim 32, further comprising the step of engaging the tool to the disk concave convex portion.

35. The method of claim 32, further comprising the step of engaging the tool to both the disk peripheral flange and the disk concave convex portion.

36. A method of constructing a rupture disk, comprising the steps of:
   a) providing a disk blank having a peripheral flange and a concave convex portion that is surrounded by the peripheral flange;
   b) rotating the disk blank upon a turntable, wherein the turntable contacts the disk concave convex portion;
   c) during the rotating of step "b", scoring the surface of the concave convex portion with a wire of a wire electrical discharging machine, said wire having an outer surface with a shaped surface;
   d) wherein the score includes a shaped portion that has the same shape as the shape of the at least a part of the shaped outer surface of the wire;
   e) wherein the wire is advanced toward the disk central axis as the score is formed in steps "b" and "c";
   f) wherein the wire is spaced away from the peripheral flange in step "d"; and
   g) wherein in steps "c" and "d" the wire is positioned generally parallel to a plane defined by the peripheral flange.

* * * * *